(12) United States Patent
Koshima

(10) Patent No.: US 8,574,466 B2
(45) Date of Patent: Nov. 5, 2013

(54) MODIFIED POLYAMINE

(71) Applicant: Ajinomoto Co., Inc., Chuo-ku (JP)

(72) Inventor: Yuji Koshima, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 13/741,667

(22) Filed: Jan. 15, 2013

(65) Prior Publication Data

US 2013/0126804 A1    May 23, 2013

Related U.S. Application Data

(63) Continuation of application No. PCT/JP2011/066643, filed on Jul. 14, 2011.

(30) Foreign Application Priority Data

Jul. 15, 2010 (JP) ................................ 2010-160728

(51) Int. Cl.
*G02B 5/23* (2006.01)
*C08L 85/02* (2006.01)

(52) U.S. Cl.
USPC ........... 252/586; 524/502; 524/513; 524/532; 524/539; 525/167; 525/188; 525/437; 525/450

(58) Field of Classification Search
USPC ............... 106/411; 252/586; 349/61, 70, 106, 349/885; 524/502, 513, 532, 539; 525/167, 525/188, 437, 450
See application file for complete search history.

(56) References Cited

U.S. PATENT DOCUMENTS

| 6,194,539 | B1 | 2/2001 | Matsui |
| 2010/0174046 | A1 | 7/2010 | Liu et al. |

FOREIGN PATENT DOCUMENTS

| JP | 2-48029 | A | 2/1990 | |
| JP | 8-143813 | A | 6/1996 | |
| JP | 9-157374 | A | 6/1997 | |
| JP | 9-313917 | A | 12/1997 | |
| JP | 2005-232332 | * | 9/2005 | ............... C09C 1/56 |
| JP | 2005-232332 | A | 9/2005 | |
| JP | 2009-531490 | A | 9/2009 | |
| JP | 2009-242650 | A | 10/2009 | |
| JP | 2010-134278 | * | 6/2010 | ............... G02B 5/20 |
| JP | 2010-134278 | A | 6/2010 | |

OTHER PUBLICATIONS

International Search Report issued Aug. 16, 2011 in PCT/JP2011/066643 (with English-language translation).
Notification of Transmittal of Translation of the International Preliminary Report on Patentability issued Feb. 21, 2013 in PCT/JP2011/066643 filed Jul. 14, 2011.
Written Opinion issued Aug. 16, 2011 in PCT/JP2011/066643 filed Jul. 14, 2011.

* cited by examiner

*Primary Examiner* — Bijan Ahvazi
(74) *Attorney, Agent, or Firm* — Oblon, Spivak, McClelland, Maier & Neustadt, L.L.P.

(57) ABSTRACT

A pigment dispersant which includes a modified polyamine obtained by the reaction of a polyamine having two or more primary and/or secondary amino groups per molecule and containing 2 to 1800 nitrogen atoms per molecule, a polyester, and a phosphorus-containing compound. The modified polyamine exhibits excellent pigment dispersion performance, shows little change in color tone upon heating, and has excellent heat resistance.

18 Claims, No Drawings

MODIFIED POLYAMINE

CONTINUING APPLICATION INFORMATION

This application is a continuation of International application No. PCT/JP2011/066643, filed on Jul. 14, 2011, which claims priority to Japanese application No. 160728/2010, filed on Jul. 15, 2010, both of which are incorporated herein by reference.

TECHNICAL FIELD

The present invention relates to a specific modified polyamine, a pigment dispersant, and a pigment-containing composition, methods of making and methods of use thereof.

DESCRIPTION OF THE BACKGROUND

A color filter is an important component which directly affects the color display quality of a liquid crystal display. The color filter is configured such that small resin films each containing a pixel of any of three primary colors of RGB (red, green, and blue) are arranged on a transparent glass substrate, and is required to have abilities important to a color display such as high light transmittance, high contrast, and chromaticity. At present, since a wide variety of properties such as properties required for panel structure such as light resistance and smoothness, and properties required for panel assembly such as heat resistance, chemical resistance, and dimensional stability are demanded, a pigment is used as a colorant for producing a color filter. In order to achieve high performance, it is necessary to disperse a pigment in a state close to primary particles, and a dispersant having excellent dispersion performance is used for this purpose.

However, since heating is performed in producing a color filter, there are problems that the color tone is changed after heating and the color purity is decreased. Therefore, in order to avoid these problems, various studies have been carried out.

Patent document 1 discloses a method utilizing an amine oxide group-containing maleic anhydride copolymer as a dispersant to be used for expensive industrial painting such as automobile painting. The productivity thereof and the color tone of the dispersant itself have been improved, however, there is no description of heat resistance.

Further, Patent documents 2 and 3 propose a polyallylamine derivative in which a polyester or the like is introduced into an amino group of a polyamine as a dispersant to be used for a pigmented paint, a printing ink, coloring a plastic, etc., however, there is no description of heat resistance.

Patent document 4 describes that the heat resistance is improved by adding an antioxidant such as a phosphite triester to a pigment dispersant ink, however, sufficient heat resistance has not been achieved yet.

CITED PATENT DOCUMENTS

Patent document 1: JP-A-2000-226414
Patent document 2: JP-A-9-169821
Patent document 3: JP-T-2001-510392
Patent document 4: JP-A-2010-134278

SUMMARY OF THE INVENTION

An object to be achieved by the invention is to provide a novel material capable of preparing a dispersant which exhibits excellent pigment dispersion performance, shows little change in color tone upon heating, and has excellent heat resistance.

The present inventors made intensive studies to achieve the above object, and as a result, they found that the above object can be achieved by using a specific modified polyamine as an effective component and completed the present invention.

Thus, the invention includes the following embodiments.

[1] A modified polyamine produced by a reaction of:
  (i) a polyamine containing 2 to 1800 primary and/or secondary amino groups per molecule;
  (ii) a polyester; and
  (iii) a phosphorus-containing compound selected from the group consisting of a compound represented by the formula (1), a tautomer thereof, a metal salt thereof, and an amine salt thereof.

In the formula above, $R_1$ and $R_2$ each independently represent hydrogen, a hydroxy group, a cyano group, or —O—$R_3$, and $R_3$ represents a hydrocarbon group having 1 to 24 carbon atoms.

[2] The modified polyamine according to the above [1], wherein the polyamine is selected from a poly(lower alkylene)imine (with the proviso that the lower alkylene has 2 to 4 carbon atoms) and a polyallylamine.

[3] The modified polyamine according to the above [1], wherein the polyamine is selected from a polyethyleneimine containing a repeating unit represented by the formula (2) and a polyallylamine containing a repeating unit represented by the formula (3).

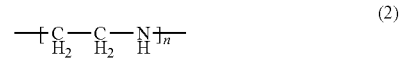

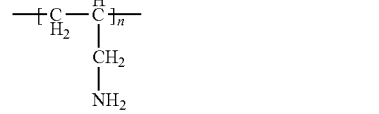

wherein n represents the number of repeating units.

[4] The modified polyamine according to any one of the above [1] to [3], wherein the polyester is represented by the formula (4).

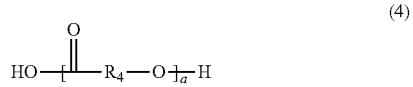

In the formula (4), $R_4$ represents a linear or branched alkylene group having 2 to 20 carbon atoms, and a represents an integer of 2 to 100.

[5] The modified polyamine according to any one of the above [1] to [3], wherein the polyester is represented by the formula (5).

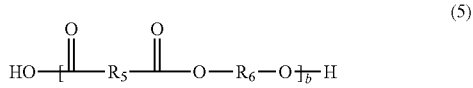

(5)

In the formula (5), $R_5$ represents a linear or branched alkylene group having 2 to 20 carbon atoms, $C_6H_4$, or CH=CH, $R_6$ represents a linear or branched alkylene group having 2 to 20 carbon atoms or a group obtained by removing two hydroxy groups from a polyalkylene glycol, and b represents an integer of 2 to 100, with the proviso that in a chain of the linear or branched alkylene group, an ether bond may be contained.

[6] The modified polyamine according to any one of the above [1] to [5], wherein the amount of the polyester is from 2 to 50 parts by weight with respect to 1 part by weight of the polyamine.

[7] The modified polyamine according to any one of the above [1] to [6], wherein the amount of the phosphorus-containing compound is from 0.004 to 0.7 (mol/the number of moles of amino groups) with respect to the number of moles of the primary and/or secondary amino groups of the polyamine.

[8] A pigment dispersant, including the modified polyamine according to any one of the above [1] to [7].

[9] A pigment-containing composition, including the modified polyamine according to any one of the above [1] to [7], an organic solvent, and a pigment.

[10] The pigment-containing composition according to the above [9], further including a resin selected from the group consisting of an alkyd resin, a polyester resin, an acrylic resin, an epoxy resin, a polyurethane resin, a silicone resin, a fluorine resin, a melamine resin, a benzoguanamine resin, a urea resin, a polyamide resin, a phenolic resin, a polyvinyl chloride resin, a polyethylene resin, and a polyolefin resin.

Other embodiments of the present invention are described below. It should be noted that all ranges described herein explicitly include all specific values and subranges therebetween.

By using the modified polyamine of the invention as an effective component, it became possible to provide a dispersant which exhibits excellent pigment dispersion performance, shows little change in color tone even when used in a high-temperature environment, has a high thermal decomposition temperature and therefore has excellent heat resistance. The dispersant can be widely used in a field which needs a coating step requiring heating in the production of a color filter, and so on.

Hereinafter, the modified polyamine, the pigment dispersant, and the pigment-containing composition of the invention will be described in detail.

The modified polyamine of the invention is a modified polyamine produced by a reaction of: (i) a polyamine containing 2 to 1800 primary and/or secondary amino groups per molecule; (ii) a polyester; and (iii) a phosphorus-containing compound selected from the group consisting of a compound represented by the formula (1), a tautomer thereof, a metal salt thereof, and an amine salt thereof.

(1)

In the formula above, $R_1$ and $R_2$ each independently represent hydrogen, a hydroxy group, a cyano group, or —O—$R_3$, and $R_3$ represents a hydrocarbon group having 1 to 24 carbon atoms.

Polyamine

The polyamine to be used in the invention is a compound containing 2 to 1800 primary and/or secondary amino groups per molecule. Since there are some cases where if the number of nitrogen atoms per molecule is too small, the dispersion performance of an obtained dispersant is insufficient, the lower limit thereof is set to preferably 2, more preferably 10, and further more preferably 20. Since there are some cases where if the number of nitrogen atoms per molecule is too large, the solubility in a solvent, particularly in a non-polar solvent is insufficient, the upper limit thereof is set to preferably 1800, more preferably 1500, further more preferably 1000, and still further more preferably 500. These range include all specific values and subranges therebetween, such 5, 10, 25, 50, 100, 250, 600, 750, 1000, 1200 and 1700 primary and/or secondary amino groups per molecule. The term polyamine is a collective term for aliphatic hydrocarbons in which at least two or more amino groups are bonded, and examples thereof include linear polyamines such as 1,4-diaminobutane and diethylenetriamine; cyclic polyamines such as 1,4,8,11-tetraazacyclotetradecane and 1,4,7,10,13, 16-hexaazacyclooctadecane; poly(lower alkylene)imines and polyallylamines. Among these, poly(lower alkylene)imines and polyallylamines are preferred. Here, the "lower alkylene" refers to an alkylene group having 2 to 4 carbon atoms.

As the poly(lower alkylene)imine, a polyethyleneimine containing a repeating unit represented by the formula (2) is preferably used.

(2)

In the formula (2), n is an integer indicating the number of repeating units per molecule.

The number average molecular weight of the poly(lower alkylene)imine is not particularly limited as long as it is in a range of from 200 to 80,000, and the poly(lower alkylene) imine may be branched or linear. Since there are some cases where the adsorption strength thereof to a pigment is insufficient to cause a difficulty in dispersing the pigment, the lower limit of the average molecular weight thereof is set to preferably 200, more preferably 300, further more preferably 400, still further more preferably 500, and most preferably 600. Further, since there are some cases where pigment molecules are aggregated to cause a difficulty in dispersing the pigment, and also the viscosity of the pigment dispersion composition is increased too much, the upper limit of the average molecular weight thereof is set to preferably 80,000, more preferably 30,000, further more preferably 10,000, and still further more preferably 5,000. The present invention includes all specific values and subranges therebetween, such as 250, 750, 1,000, 2,000, 7,700, 15,000, 20,000, 25,000, 35,000, 40,000, 50,000, 60,000 and 70,000.

The polyethyleneimine can be commercially available, and examples thereof include "Epomine SP-018" and "Epomine SP-200" manufactured by Nippon Shokubai Co., Ltd.

As the polyallylamine, a polyallylamine containing a repeating unit represented by the formula (3) is preferably used.

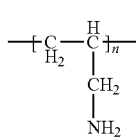

(3)

In the formula, n is an integer indicating the number of repeating units per molecule.

The number average molecular weight of the polyallylamine to be used in the invention is not particularly limited as long as it is from 150 to 100,000. Since there are some cases where the adsorption strength thereof to a pigment is insufficient to cause a difficulty in dispersing the pigment, the lower limit of the average molecular weight thereof is set to preferably 150, more preferably 300, further more preferably 450, still further more preferably 500, and most preferably 600. Further, since there are some cases where pigment molecules are aggregated to cause a difficulty in dispersing the pigment, and also the viscosity of the pigment dispersion composition is increased too much, the upper limit of the average molecular weight thereof is set to preferably 100,000, more preferably 80,000, furthermore preferably 30,000, still further more preferably 10,000, and most preferably 5,000. This ranges includes all specific values and subranges therebetween, such as 750, 1,000, 12,000, 15,000, 25,000, 40,000, 50,000, 60,000, 70,000 and 90,000.

The polyallylamine can be commercially available, and examples thereof include "PAA" series manufactured by Nitto Boseki Co., Ltd.

The poly(lower alkylene)imine and the polyallylamine may be used in combination.

Polyester

The polyester to be used in the invention is not particularly limited, however, polyesters having a free carboxyl group and represented by the following formula (4) or (5) can be used alone or in combination of two or more types thereof.

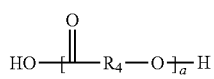

(4)

In the formula, $R_4$ represents a linear or branched alkylene group having 2 to 20 carbon atoms, and a represents an integer of 2 to 100.

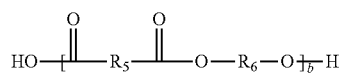

(5)

In the formula above, $R_5$ represents a linear or branched alkylene group having 2 to 20 carbon atoms, $C_6H_4$, or CH=CH, $R_6$ represents a linear or branched alkylene group having 2 to 20 carbon atoms or a group obtained by removing two hydroxy groups from a polyalkylene glycol, and b represents an integer of 2 to 100, with the proviso that in a chain of the linear or branched alkylene group, an ether bond may be contained.

Further, a polyester obtained by randomly polymerizing the repeating components of the formulae (4) and (5) may be used.

The polyester of the formula (4) is produced using a hydroxycarboxylic acid represented by the formula (6) or a lactone represented by the formula (7) as a starting material.

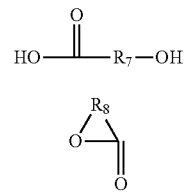

(6)

(7)

In the formulae above, $R_7$ and $R_8$ each represent a linear or branched alkylene group having 2 to 20 carbon atoms.

Examples of the hydroxycarboxylic acid represented by the formula (6) include ricinoleic acid, ricinolenic acid, a mixture of 9- and 10-hydroxystearic acids, 12-hydroxystearic acid, castor oil fatty acid, hydrogenated castor oil fatty acid, hydroxypivalic acid, lactic acid, and glycolic acid. Preferred is 12-hydroxystearic acid. Examples of the lactone represented by the formula (7) include ε-caprolactone, β-propiolactone, γ-butyrolactone, δ-valerolactone, β-methyl-δ-valerolactone, 4-methylcaprolactone, and 2-methylcaprolactone. Preferred is ε-caprolactone.

More specifically, the polyester can be produced by heating the hydroxy acid or the lactone or a mixture of the hydroxy acid and the lactone. A polymerization catalyst may be used. A reaction temperature is from 120 to 220° C., and preferably from 140 to 210° C. Further, a reaction time is from 0.5 to 72 hours. At this time, when a reaction is carried out under a nitrogen stream, a polymer having a high degree of polymerization can be obtained. Further, if a polymerization initiator is used at this time, the control of the reaction is facilitated. In the case where the lactone is used as a starting material, it is also possible to use a monocarboxylic acid serving as a polymerization initiator in an amount of from 0 to 0.5 moles with respect to 1 mole of the lactone.

Examples of the polymerization catalyst include quaternary ammonium salts such as tetramethylammonium chloride, tetrabutylammonium chloride, tetramethylammonium bromide, tetrabutylammonium bromide, tetramethylammonium iodide, tetrabutylammonium iodide, benzyltrimethylammonium chloride, benzyltrimethylammonium bromide, and benzyltrimethylammonium iodide; quaternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide, tetraphenylphosphonium chloride, tetraphenylphosphonium bromide, and tetraphenylphosphonium iodide; phosphorus compounds such as triphenylphosphine; organic carboxylic acid salts such as potassium acetate, sodium acetate, potassium benzoate, and sodium benzoate; alkali metal alcolates such as sodium alcolate and potassium alcolate; tertiary amines; organotin compounds; organoaluminum compounds; organotitanate compounds; and zinc compounds such as zinc chloride.

Examples of the polymerization initiator include monocarboxylic acids including: aliphatic monocarboxylic acids such as acetic acid, propionic acid, caprylic acid, nonanoic acid, capric acid, octylic acid, lauric acid, myristic acid, palmitic acid, stearic acid, isononanoic acid, and arachic acid; and aromatic monocarboxylic acids such as benzoic acid and p-butylbenzoic acid.

The polyester of the formula (5) can be produced by a reaction of a diol represented by the formula (8) and a dibasic acid represented by the formula (9).

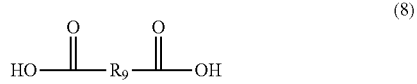

In the formulae above, $R_9$ represents a linear or branched alkylene group having 2 to 20 carbon atoms, $C_6H_4$, or CH=CH, and $R_{10}$ represents a linear or branched alkylene group having 2 to 20 carbon atoms or a group obtained by removing two hydroxy groups from a polyalkylene glycol.

Examples of the diol represented by the formula (9) include alkylene glycols such as ethylene glycol, propylene glycol, neopentyl glycol, 1,3-butanediol, 1,4-butanediol, and 1,6-hexanediol; and diols having an ether bond such as diethylene glycol, dipropylene glycol, and triethylene glycol. Preferred is ethylene glycol. Examples of the dibasic acid represented by the formula (8) include dibasic acids having an unsaturated bond such as maleic anhydride and fumaric acid; aromatic dibasic acids such as phthalic anhydride and terephthalic acid; and saturated dibasic acids such as adipic acid and sebacic acid. Preferred is adipic acid.

More specifically, the polyester can be produced by adding the polymerization catalyst to a mixture of equimolar amounts of the diol and the dibasic acid, followed by heating. At this time, it is preferred to add the dibasic acid in a slightly excess amount. A reaction temperature is from 120 to 220° C., and more preferably from 140 to 210° C. Further, a reaction time is from 0.5 to 72 hours. At this time, when a reaction is carried out under a nitrogen stream, a polymer having a high degree of polymerization can be obtained. Further, if a polymerization initiator is used at this time, the control of the reaction is facilitated.

As the polymerization catalyst and the polymerization initiator to be used in the reaction, the same ones as used in the production of the polyester represented by the formula (4) may be used.

The polyester obtained by randomly polymerizing the repeating components of the formulae (4) and (5) can be produced by adding a polymerization catalyst to a mixture of the hydroxy acid, the lactone, and equimolar amounts of the diol and the dibasic acid, followed by heating, etc. The reaction conditions are the same as in the case of (4).

The polyester having a structure in which the repeating components of the formulae (4) and (5) are polymerized into a block shape can be obtained by producing the polyesters of the formulae (4) and (5) in advance, followed by dehydration condensation between these polyesters.

The molecular weight of the polyester to be used in the invention may be in a range of from 300 to 20,000, however, since there are some cases where the length of a side chain of the dispersant is too short to obtain a sufficient dispersion effect, the lower limit of the molecular weight thereof is set to preferably 300, more preferably 500, further more preferably 800, and most preferably 1000. Since there are some cases where the length of a side chain of the dispersant is too long, thereby causing the aggregation of pigment molecules to decrease fluidity, the upper limit of the molecular weight thereof is set to preferably 20,000, more preferably 16,000, furthermore preferably 13,000, and most preferably 10,000. The present invention includes all specific values and subranges therebetween, such as 750, 2,000, 5,000, 12,000, 15,000 and 18,000. The polyester having a molecular weight within the above range can be obtained by setting a molar ratio of the polymerization initiator to the hydroxy acid, the lactone, the diol, or the dibasic acid to be used as the starting material, and also by finding out an appropriate reaction time by observing the acid value of the reaction product in the course of the reaction.

The acid value of the polyester to be used in the invention may be in a range of from 2.8 to 190, inclusive of all specific values and subranges therebetween. Since there are some cases where the length of a side chain of the dispersant is too long, thereby causing the aggregation of pigment molecules to decrease fluidity, the lower limit of the acid value thereof is set to preferably 2.8, more preferably 3.5, further more preferably 4.5, and most preferably 6.0. Since there are some cases where the length of a side chain of the dispersant is too short to obtain a sufficient dispersion effect, the upper limit of the acid value thereof is set to preferably 190, more preferably 120, further more preferably 70, and most preferably 60. The polyester having an acid value within the above range can be obtained by setting a molar ratio of the polymerization initiator to the hydroxy acid, the lactone, the diol, or the dibasic acid to be used as the starting material, and also by finding out an appropriate reaction time by observing the acid value of the reaction product in the course of the reaction.

Phosphorus-Containing Compound

As the phosphorus-containing compound to be used in the invention, a compound represented by the formula (1), a tautomer thereof, a metal salt thereof, and an amine salt thereof can be exemplified.

In the formula (1), $R_1$ and $R_2$ each independently represent hydrogen, a hydroxy group, a cyano group, or —O—$R_3$, and $R_3$ represents a hydrocarbon group having 1 to 24 carbon atoms. A compound in which at least either one of $R_1$ and $R_2$ is a hydroxy group is more preferred.

For example, phosphonic acid, phosphinic acid (hypophosphorous acid), or phosphine oxide, or a tautomer thereof such as phosphorous acid, phosphonous acid, phosphinous acid, or the like can be used. Further, a salt of an amine substance with such a compound such as ammonium phosphinate can be used. Further, cyanophosphonic acid, cyanophosphinic acid, or the like can also be used. Among these, a compound having a hydroxy group and/or a compound represented by a tautomer thereof are/is preferred because such compounds have high compatibility with the modified polyamine and high binding capability thereto. Among these, phosphinic acid (hypophosphorous acid) and phosphorous acid are more preferred, and phosphorous acid is further more preferred.

Modified Polyamine

The modified polyamine of the invention can be obtained by a reaction of: (i) the above-described polyamine; (ii) the above-described polyester; and (iii) the above-described phosphorus-containing compound. The phosphorus-containing compound may be reacted after the polyamine and the polyester are reacted with each other. Further, the polyamine, the polyester, and the phosphorus-containing compound can be simultaneously added and reacted with one another.

The reaction between the polyamine and the polyester will be more specifically described below. The polyester is mixed in an amount of from 2 to 50 parts by weight with respect to 1 part by mass of the polyamine and the two components are reacted with each other. From the viewpoint of pigment dispersion performance, the lower limit of the amount of the polyester is preferably 2, more preferably 5, and further more preferably 10, and the upper limit thereof is preferably 50, more preferably 40, and further more preferably 30. At this time, there is no problem that a different type of the polyester is simultaneously reacted. A polymerization catalyst may be used in the reaction, and as the polymerization catalyst to be used, any of the polymerization catalysts described above in the production of the polyester can be used. Further, there is no problem at all that a solvent such as xylene or toluene is used in the reaction.

The reaction between the polyamine and the polyester may be either of a salt forming reaction and an amide bond forming reaction through a free amino group of the polyamine and a terminal free carboxyl group of the polyester, and an ester-amide exchange reaction may be simultaneously caused.

The amide bond forming reaction may be carried out at 90 to 250° C. Since there are some cases where a reaction product is colored, the upper limit of the temperature is set to preferably 250° C., and more preferably 210° C. Further, since there are some cases where a reaction time is prolonged, the lower limit of the temperature is set to preferably 90° C., and more preferably 100° C. In addition, when the reaction is carried out under a nitrogen stream, a reaction product which is less colored is obtained.

The amide bond forming ratio (amidation ratio) of an amino group of the polyamine and the polyester in the modified polyamine of the invention can be determined by measuring an amine value A at the time of initiation of the reaction and an amine value B at the time of completion of the reaction and calculating a change between these values.

Amide bond forming ratio (amidation ratio)=$(A-B)/A \times 100$   Expression 1

Incidentally, the amine value to be determined is not affected at all even if an amino group of the polyamine and the carboxyl group of a polymer to be introduced into a side chain form a salt.

The reaction between the polyamine and the phosphorus-containing compound will be more specifically described below. The phosphorus-containing compound is mixed with the polyamine such that the amount of the phosphorus-containing compound is from 0.004 to 0.7 (mol/the number of moles of amino groups) with respect to the number of moles of the primary and/or secondary amino groups of the polyamine. Since there are some cases where the resistance to thermal coloration of the modified polyamine is insufficient, the lower limit thereof is preferably 0.004, more preferably 0.005, further more preferably 0.008, and particularly preferably 0.009. Since there are some cases where the pigment dispersion performance is insufficient, the upper limit thereof is preferably 0.7, more preferably 0.6, and further more preferably 0.5.

The reaction between the polyamine and the phosphorus-containing compound is a salt forming reaction through a free amino group of the polyamine and a hydroxy group of the phosphorus-containing compound.

The modified polyamine of the invention has a property of well dispersing a pigment in an organic solvent or a resin, and therefore can be used as a pigment dispersant. Further, a pigment-containing composition can be prepared by using the modified polyamine of the invention and adding a pigment, a solvent, a resin, etc. thereto.

The pigment-containing composition of the invention may be constituted by three components including the modified polyamine of the invention, a pigment, and an organic solvent, or four components including a dispersion resin (resin for forming a film) in addition to the above three components, and moreover, the composition may be constituted by components additionally including an additive such as an anti-foaming agent or a surface conditioner.

Examples of the organic solvent to be used for the preparation of the pigment-containing composition include hydrocarbon solvents such as toluene, xylene, high-boiling point petroleum hydrocarbons, n-hexane, cyclohexane, and n-heptane; halogenated hydrocarbon solvents such as methylene chloride, chloroform, and dichloroethane; ether solvents such as dioxane, tetrahydrofuran, butyl ether, butyl ethyl ether, and diglyme; ketone solvents such as methyl isobutyl ketone, cyclohexanone, and isophorone; ester solvents such as ethyl acetate, butyl acetate, ethylene glycol monoethyl ether acetate, and 2-methoxypropyl acetate; alcohol solvents such as methyl alcohol, ethyl alcohol, n-propyl alcohol, isopropyl alcohol, n-butyl alcohol, isobutyl alcohol, t-butyl alcohol, amyl alcohol, n-hexyl alcohol, n-heptyl alcohol, 2-ethylhexyl alcohol, lauryl alcohol, stearyl alcohol, cyclopentanol, cyclohexanol, benzyl alcohol, and p-t-butylbenzyl alcohol; mono-ether solvents of alkylene glycols such as ethylene glycol monomethyl ether, ethylene glycol monoethyl ether, ethylene glycol monobutyl ether, propylene glycol monomethyl ether, propylene glycol monoethyl ether, and propylene glycol monobutyl ether; and amide solvents such as dimethylacetoamide and dimethylformamide. The organic solvent is appropriately selected depending on the usage of the pigment-containing composition. These solvents can be used appropriately alone or by mixing two or more types thereof.

Examples of the pigment include inorganic pigments such as titanium dioxide, iron oxide, cadmium sulfide, calcium carbonate, barium carbonate, barium sulfate, clay, talc, chrome yellow, carbon black, cadmium yellow, cadmium red, red ocher, iron black, zinc oxide, prussian blue, and ultramarine blue; and organic pigments such as monoazo, diazo, azo lake, condensed azo, chelate azo, indigo, thioindigo, anthraquinone, dianthraquinonyl, anthrapyrimidine, anthanthrone, benzoimidazolone, pyranthrone, phthalocyanine, halogenated phthalocyanine, flavanthrone, quinacridone, dioxazine, diketopyrrolopyrrole, indanthrone, isoindolinone, isoindoline, quinophthalone, perylene, perynone, acid dye, basic dye, azine, daylight fluorescent, nitroso, and nitro organic pigments. The modified polyamine of the invention exhibits an excellent pigment dispersion improving effect particularly on carbon black and organic pigments among these pigments.

The modified polyamine of the invention is used in an amount of from 0.005 to 2 parts by weight with respect to 1 part by weight of the pigment. The amount of the modified polyamine can be appropriately selected according to the type of the pigment, for example, an inorganic pigment, an organic pigment, etc.

Examples of the dispersion resin (resin for forming a film) to be contained in the pigment-containing composition include a wide variety of resins such as an alkyd resin, a polyester resin, an acrylic resin, an epoxy resin, a polyurethane resin, a silicone resin, a fluorine resin, a melamine resin, a benzoguanamine resin, a urea resin, a polyamide resin, a phenolic resin, a polyvinyl chloride resin and a polyethylene resin. However, the dispersion resin is not limited thereto.

The pigment-containing composition of the invention can be produced by dispersing the necessary starting materials appropriately using a roll mill, a ball mill, a sand grind mill, a paint shaker, a kneader, a dissolver, an ultrasonic dispersing machine, and the like according to the usage of the pigment-containing composition.

The pigment-containing composition of the invention can be prepared by using an integral blend method in which the modified polyamine of the invention, the pigment, and the resin are simultaneously kneaded, and also can be prepared by kneading the resin and the pigment surface-treated with the modified polyamine of the invention.

In the case where the pigment is surface-treated with the modified polyamine of the invention, a dry method using a Henschel mixer, a ball mill, an atomizer colloid mill, a Banbury mixer, or the like or a wet solvent method, in which mixing is performed in a solvent and thereafter the solvent is removed, may be used. Examples of the solvent to be used in the wet solvent method include aromatic hydrocarbons such as toluene and xylene; aliphatic hydrocarbons such as n-hexane and n-heptane; alcohols such as isopropanol and butanol; ethers such as ethylcellosolve and butylcellosolve; ketones such as methyl ethyl ketone and acetone; esters such as ethyl acetate and butyl acetate; and water.

By appropriately adjusting the amount of the organic solvent when preparing the pigment-containing composition of the invention, the pigment-containing composition can be distributed as a product having a concentration, at which the product can be used as it is, or as a product in a concentrated form, which can be thinned with a solvent by a purchaser to adjust the concentration thereof to an appropriate level and used.

Further, in the pigment-containing composition, an additive such as an antioxidant, a UV absorber, a hindered amine, a plasticizer, or a flame retardant can be blended to such an extent that the additive does not inhibit the effect of the invention.

The pigment-containing composition which has excellent pigment dispersion performance and resistance to thermal coloration can also be produced by adding the modified polyamine of the invention to an existing pigment-containing composition.

The pigment-containing composition of the invention can be used in a pigmented paint, a printing ink, a color filter ink, a color filter resist, an inkjet ink, a copy ink, a magnetic tape, a rubber magnet, a color plastic molded product, and a sealing agent to be used for construction. Since the pigment-containing composition obtained by using the modified polyamine of the invention has excellent heat resistance, pigment dispersion performance, and dispersion stability, it is suitable to be used in a high-temperature environment. Particularly, in a step of producing a color filter, heating is performed at 200° C. or higher for 20 minutes to 2 hours, and therefore, if a dispersant having poor heat resistance is used, there arises a problem that the color tone is changed after such high-temperature processing to decrease the color purity. Accordingly, by using the pigment-containing composition of the invention having excellent heat resistance, this problem can be solved.

EXAMPLES

Hereinafter, the invention will be more specifically described with reference to Examples, Usage Examples, and Comparative Usage Examples, however, the invention is not limited thereto. The "part(s)" and "%" in the respective Examples are both based on weight.

Preparation of Modified Polyamine

Production Example 1

Preparation 1 of Polyester (PES-1)

To a reaction flask provided with a thermometer, a stirrer, a nitrogen introduction inlet, a reflux condenser, a water separator, and a decompression port, 30.0 parts of xylene (manufactured by Junsei Chemical Co., Ltd., hereinafter the same shall apply), 300.0 parts of 12-hydroxystearic acid (manufactured by Junsei Chemical Co., Ltd., hereinafter the same shall apply), and 0.1 parts of tetrabutyl titanate (manufactured by Tokyo Chemical Industry Co., Ltd., hereinafter the same shall apply) were fed, and the temperature was raised to 200° C. under a nitrogen stream over a period of 4 hours. The reaction mixture was further heated at 200° C. for 5 hours, and water generated during the heating reaction and xylene were distilled off. Thereafter, the reaction mixture was cooled to room temperature.

This reaction product is called Polyester PES-1. The Polyester PES-1 had a molecular weight of 1670 and an acid value of 33.5 mg KOH/g.

Production Example 2

Preparation 2 of Polyester (PES-2)

To the same reaction flask as in Production Example 1, 10.0 parts of 12-hydroxystearic acid, 190 parts of ε-caprolactone (manufactured by Junsei Chemical Co., Ltd., hereinafter the same shall apply), and 0.1 parts of tetrabutyl titanate were fed, and the temperature was raised to 160° C. under a nitrogen stream over a period of 2 hours. The reaction mixture was heated at 160° C. for 4 hours, and then, the heating was continued until the residual amount of ε-caprolactone was decreased to 1% or less. Thereafter, the reaction mixture was cooled to room temperature.

This reaction product is called Polyester PES-2. The Polyester PES-2 had a molecular weight of 6230 and an acid value of 9.0 mg KOH/g.

Production Example 3

Preparation 3 of Polyester (PES-3)

To the same reaction flask as in Production Example 1, 5.0 parts of xylene, 15.5 parts of ethylene glycol (manufactured by Junsei Chemical Co., Ltd., hereinafter the same shall apply), 36.5 parts of adipic acid (manufactured by Junsei Chemical Co., Ltd., hereinafter the same shall apply), and 0.1 parts of tetrabutyl titanate were fed, and the temperature was raised to 160° C. under a nitrogen stream over a period of 4 hours. The reaction mixture was further heated at 160° C. for 2 hours. Water generated during the heating reaction and xylene were distilled off. Thereafter, the reaction mixture was cooled to room temperature.

This reaction product is called Polyester PES-3. The Polyester PES-3 had a molecular weight of 2610 and an acid value of 21.5 mg KOH/g.

Production Example 4

Preparation 4 of Polyester (PES-4)

To the same reaction flask as in Production Example 1, 12.5 parts of xylene, 15.5 parts of ethylene glycol, 36.5 parts of adipic acid, 75.0 parts of 12-hydroxystearic acid, and 0.1 parts of tetrabutyl titanate were fed, and the temperature was raised to 160° C. under a nitrogen stream over a period of 4 hours. The reaction mixture was further heated at 160° C. for 2 hours. Water generated during the heating reaction and xylene were distilled off. Thereafter, the reaction mixture was cooled to room temperature.

This reaction product is called Polyester PES-4. The polyester in the Polyester PES-4 had a molecular weight of 2490 and an acid value of 22.5 mg KOH/g.

Example 1

Preparation of Modified Polyamine
(Polyethyleneimine Derivative)

In a reaction flask provided with a thermometer, a stirrer, a nitrogen introduction inlet, a reflux condenser, a water separator, and a decompression port, 10 parts of a polyethyleneimine ("SP-018", manufactured by Nippon Shokubai Co., Ltd., average molecular weight: about 1,800) and 100 parts of Polyester (PES-2) obtained in Production Example 2 were mixed at 130° C., and a reaction was allowed to proceed at 130° C. for 3 hours while distilling off water generated during the reaction. Thereafter, the reaction mixture was cooled to 90° C.

Subsequently, 0.75 parts of phosphorous acid (manufactured by Wako Pure Chemical Industries, Ltd., hereinafter the same shall apply) was added thereto, and a reaction was allowed to proceed by stirring the mixture at 90° C. for 1 hour. Then, the reaction mixture was cooled to room temperature.

Examples 2 to 10 and 12 to 21, and Comparative
Examples 1 to 13

According to the formulations shown in the tables, modified polyamines were prepared in the same manner as in Example 1.

Example 11

In the same flask as in Example 1, 10 parts of a polyethyleneimine ("SP-018", manufactured by Nippon Shokubai Co., Ltd., average molecular weight: about 1,800), 100 parts of Polyester (PES-2) obtained in Production Example 2, and 0.75 parts of phosphorous acid were mixed at 130° C., and a reaction was allowed to proceed at 130° C. for 3 hours while distilling off water generated during the reaction. Thereafter, the reaction mixture was cooled to room temperature.

Example 22

Preparation of Modified Polyamine (Polyallylamine Derivative)

In a reaction flask provided with a thermometer, a stirrer, a nitrogen introduction inlet, a reflux condenser, a water separator, and a decompression port, a mixture composed of 25.0 parts of xylene and 25 parts (10 parts by weight in terms of polyallylamine) of a 40% aqueous solution of a polyallylamine ("PAA" (a polyallylamine homopolymer), manufactured by Nitto Boseki Co., Ltd., number average molecular weight: about 2,300) was stirred at 130° C., and 100 parts of Polyester PES-1 obtained in Production Example 1 whose temperature had been raised to 130° C. was added thereto while distilling off water using a separating device and returning xylene to the reaction mixture. Then, a reaction was allowed to proceed at 130° C. for 3 hours. Water generated during the heating reaction and xylene were distilled off. Thereafter, the reaction mixture was cooled to 90° C.

Subsequently, 0.75 parts of phosphorous acid was added thereto, and a reaction was allowed to proceed by stirring the mixture at 90° C. for 1 hour. Then, the reaction mixture was cooled to room temperature.

Examples 23 to 31 and 33 to 40, and Comparative
Examples 14 to 26

According to the formulations shown in the tables, modified polyamines were prepared in the same manner as in Example 22.

Example 32

In the same flask as in Example 22, a mixture composed of 25.0 parts of xylene and 25 parts (10 parts by weight in terms of polyallylamine) of a 40% aqueous solution of a polyallylamine ("PAA" (a polyallylamine homopolymer), manufactured by Nitto Boseki Co., Ltd., number average molecular weight: about 2,300) was stirred at 130° C., and while distilling off water using a separating device and returning xylene to the reaction mixture, 100 parts of Polyester PES-1 obtained in Production Example 1 whose temperature had been raised to 130° C. was added thereto, and also 0.75 parts of phosphorous acid was added thereto, and a reaction was allowed to proceed at 130° C. for 3 hours. Water generated during the heating reaction and xylene were distilled off. After completion of the reaction, the reaction mixture was cooled to room temperature.

Evaluation

Evaluation of Heat Resistance 1

5 g of the modified polyamine was weighed on a 45-mm diameter aluminum dish and melted by heating at 70° C. for 5 minutes in a nitrogen atmosphere. The resulting material was used as a sample before heating. With respect to the color tone, a color difference (ΔE) between the sample and a standard white plate was measured using a color reader (manufactured by Minolta Co., Ltd.). Subsequently, the same sample was heated in an oven at 180° C. for 30 minutes in an air atmosphere. The resulting material was used as a sample after heating at 180° C. With respect to the color tone, a color difference (ΔE) between the sample and the standard white plate was measured using the color reader.

The evaluation of heat resistance 1 was carried out according to the following criteria.

A: A change in color difference is less than +5.

B: A change in color difference is +5 or more and less than +9.

C: A change in color difference is +9 or more and less than +20.

D: A change in color difference is +20 or more.

Evaluation of Heat Resistance 2

The measurement of the loss on heating of the modified polyamine was performed using a simultaneous thermogravimetry and differential thermal analyzer (TG-DTA 6300, manufactured by SII Nano Technology, Inc.). In the measurement, the temperature was raised at a temperature raising rate of 20° C./min in a nitrogen atmosphere, and a 10% weight loss temperature was measured. As the temperature is higher, thermal decomposition occurs less, which indicates that the heat resistance is high.

The evaluation of heat resistance 2 was carried out according to the following criteria.
A: 340° C. or higher.
B: 320° C. or higher and lower than 340° C.
C: 300° C. or higher and lower than 320° C.
D: Lower than 300° C.

Evaluation of Pigment Dispersion Performance

5 Parts by weight of the modified polyamine was dissolved in 80 parts by weight of PGMEA, and thereafter, 15 parts by weight of a copper phthalocyanine pigment "Fastogen Blue GNPSG" (manufactured by DIC Corporation) was blended therein, and glass beads having a diameter of 1.0 mm were added thereto, and the resulting mixture was dispersed for 6 hours using a paint shaker (manufactured by Asada Iron Works. Co., Ltd). After the dispersion, the glass beads were removed by filtration, whereby a pigment dispersion liquid was prepared. The viscosity of the obtained pigment dispersion liquid was measured at 25° C. using a viscometer VIS-COMATE (manufactured by CBC Co., Ltd.). In addition, the viscosity of the pigment dispersion liquid after being stored at 40° C. for 7 days was also measured at 25° C. in the same manner, whereby a rate of change in viscosity over time was determined.

The pigment dispersion performance was evaluated according to the following criteria.
A: A change in viscosity of the dispersion liquid: less than 5%
B: A change in viscosity of the dispersion liquid: 5% or more and less than 10%
C: A change in viscosity of the dispersion liquid: 10% or more and less than 20%
D: A change in viscosity of the dispersion liquid: 20% or more

TABLE 1-1

|  | Example 1 | Example 2 | Example 3 | Example 4 | Example 5 |
|---|---|---|---|---|---|
| Weight of polyamine (g) | 10 | 10 | 10 | 10 | 10 |
| Number of moles of amino groups | 0.23 | 0.23 | 0.23 | 0.23 | 0.23 |
| Polyester | PES-2 | PES-2 | PES-2 | PES-2 | PES-2 |
| Weight of polyester (g) | 100 | 100 | 100 | 100 | 100 |
| Phosphorus-containing compound | phosphorous acid | phosphorous acid | phosphorous acid | phosphorous acid | phosphorous acid |
| Weight of phosphorus-containing compound (g) | 0.75 | 0.075 | 0.15 | 1.5 | 4.5 |
| Phosphorus-containing compound (mol) | 0.0091 | 0.0010 | 0.0018 | 0.0183 | 0.0549 |
| Phosphorus-containing compound/amino groups of polyamine (mol/mol) | 0.0396 | 0.0043 | 0.0078 | 0.0796 | 0.2387 |
| Amine value of polyamine before modification | 97 | 97 | 97 | 97 | 97 |
| Amine value of modified polyamine | 47 | 48 | 49 | 47 | 45 |
| Reaction rate (%) | 52% | 51% | 49% | 52% | 54% |
| Color difference (ΔE) before heating | 29.2 | 29.5 | 29.5 | 29.4 | 30.4 |
| Color difference (ΔE) after heating | 34.8 | 45.2 | 39.2 | 34.0 | 36.7 |
| Change in color difference (ΔE) | 5.6 | 15.7 | 9.7 | 4.6 | 6.3 |
| Evaluation of heat resistance 1 | B | C | C | A | B |
| 10% weight loss temperature (° C.) | 321 | 302 | 305 | 328 | 340 |
| Evaluation of heat resistance 2 | B | C | C | B | A |
| Viscosity of pigment dispersion liquid (immediately after dispersion) | 7.9 | 8.2 | 8.2 | 8.0 | 8.1 |
| Viscosity of pigment dispersion liquid (after 1 week at 40° C.) | 8.3 | 8.5 | 8.5 | 8.3 | 8.5 |
| Change in viscosity of dispersion liquid | 5% | 4% | 4% | 4% | 5% |
| Evaluation of pigment dispersion performance | B | A | A | A | B |

|  | Example 6 | Example 7 | Example 8 | Example 9 | Example 10 |
|---|---|---|---|---|---|
| Weight of polyamine (g) | 10 | 10 | 10 | 10 | 10 |
| Number of moles of amino groups | 0.23 | 0.23 | 0.23 | 0.23 | 0.23 |
| Polyester | PES-2 | PES-2 | PES-1 | PES-3 | PES-4 |
| Weight of polyester (g) | 50 | 300 | 100 | 100 | 100 |
| Phosphorus-containing compound | phosphorous acid | phosphorous acid | phosphorous acid | phosphorous acid | phosphorous acid |
| Weight of phosphorus-containing compound (g) | 0.75 | 0.75 | 0.75 | 0.75 | 0.75 |
| Phosphorus-containing compound (mol) | 0.0091 | 0.0091 | 0.0091 | 0.0091 | 0.0091 |
| Phosphorus-containing compound/amino groups of polyamine (mol/mol) | 0.0396 | 0.0396 | 0.0396 | 0.0396 | 0.0396 |
| Amine value of polyamine before modification | 177 | 34 | 97 | 97 | 97 |
| Amine value of modified polyamine | 83 | 17 | 47 | 46 | 45 |
| Reaction rate (%) | 53% | 50% | 52% | 53% | 54% |
| Color difference (ΔE) before heating | 34.2 | 28.8 | 33.1 | 30.7 | 32.6 |
| Color difference (ΔE) after heating | 39.0 | 32.9 | 37.7 | 35.6 | 36.8 |
| Change in color difference (ΔE) | 4.8 | 4.1 | 4.6 | 4.9 | 4.2 |
| Evaluation of heat resistance 1 | A | A | A | A | A |
| 10% weight loss temperature (° C.) | 315 | 321 | 335 | 305 | 324 |
| Evaluation of heat resistance 2 | C | B | B | C | B |
| Viscosity of pigment dispersion liquid (immediately after dispersion) | 6.3 | 10.8 | 10.2 | 11.2 | 13.1 |
| Viscosity of pigment dispersion liquid (after 1 week at 40° C.) | 7.1 | 12.3 | 10.9 | 12.1 | 13.3 |
| Change in viscosity of dispersion liquid | 13% | 14% | 7% | 8% | 2% |
| Evaluation of pigment dispersion performance | C | C | B | B | A |

TABLE 1-2

|  | Example 11 | Example 12 | Example 13 | Example 14 | Example 15 |
|---|---|---|---|---|---|
| Weight of polyamine (g) | 10 | 10 | 10 | 10 | 10 |
| Number of moles of amino groups | 0.23 | 0.23 | 0.23 | 0.23 | 0.23 |
| Polyester | PES-2 | PES-1 | PES-1 | PES-1 | PES-1 |
| Weight of polyester (g) | 100 | 100 | 100 | 100 | 100 |
| Phosphorus-containing compound | phosphorous acid | hypophosphorous acid | hypophosphorous acid | hypophosphorous acid | hypophosphorous acid |
| Weight of phosphorus-containing compound (g) | 0.75 | 0.125 | 0.25 | 1.25 | 2.5 |
| Phosphorus-containing compound (mol) | 0.0091 | 0.0010 | 0.0020 | 0.0095 | 0.0189 |
| Phosphorus-containing compound/amino groups of polyamine (mol/mol) | 0.0396 | 0.0043 | 0.0087 | 0.0413 | 0.0822 |
| Amine value of polyamine before modification | 97 | 97 | 97 | 97 | 97 |
| Amine value of modified polyamine | 46 | 47 | 47 | 46 | 46 |
| Reaction rate (%) | 53% | 52% | 52% | 53% | 53% |
| Color difference ($\Delta E$) before heating | 29.8 | 32.8 | 32.0 | 32.2 | 31.2 |
| Color difference ($\Delta E$) after heating | 37.2 | 45.6 | 42.9 | 37.4 | 35.2 |
| Change in color difference ($\Delta E$) | 7.4 | 12.8 | 10.9 | 5.2 | 4.0 |
| Evaluation of heat resistance 1 | B | C | C | B | A |
| 10% weight loss temperature (° C.) | 328 | 321 | 330 | 352 | 357 |
| Evaluation of heat resistance 2 | B | B | B | A | A |
| Viscosity of pigment dispersion liquid (immediately after dispersion) | 8.2 | 10.2 | 10.1 | 10.3 | 10.2 |
| Viscosity of pigment dispersion liquid (after 1 week at 40° C.) | 8.5 | 10.5 | 10.4 | 10.4 | 10.5 |
| Change in viscosity of dispersion liquid | 4% | 3% | 3% | 1% | 3% |
| Evaluation of pigment dispersion performance | A | A | A | A | A |

|  | Example 16 | Example 17 | Example 18 | Example 19 | Example 20 |
|---|---|---|---|---|---|
| Weight of polyamine (g) | 10 | 10 | 10 | 10 | 10 |
| Number of moles of amino groups | 0.23 | 0.23 | 0.23 | 0.23 | 0.23 |
| Polyester | PES-1 | PES-1 | PES-1 | PES-2 | PES-3 |
| Weight of polyester (g) | 100 | 50 | 300 | 100 | 100 |
| Phosphorus-containing compound | hypophosphorous acid | hypophosphorous acid | hypophosphorous acid | hypophosphorous acid | hypophosphorous acid |
| Weight of phosphorus-containing compound (g) | 7.5 | 1.25 | 1.25 | 1.25 | 1.25 |
| Phosphorus-containing compound (mol) | 0.0568 | 0.0095 | 0.0095 | 0.0095 | 0.0095 |
| Phosphorus-containing compound/amino groups of polyamine (mol/mol) | 0.2470 | 0.0413 | 0.0413 | 0.0413 | 0.0413 |
| Amine value of polyamine before modification | 97 | 177 | 34 | 97 | 97 |
| Amine value of modified polyamine | 45 | 81 | 15 | 47 | 47 |
| Reaction rate (%) | 54% | 54% | 56% | 52% | 52% |
| Color difference ($\Delta E$) before heating | 31.5 | 32.7 | 30.9 | 28.9 | 30.3 |
| Color difference ($\Delta E$) after heating | 35.8 | 36.6 | 36.9 | 33.1 | 35.0 |
| Change in color difference ($\Delta E$) | 4.3 | 3.9 | 6.0 | 4.2 | 4.7 |
| Evaluation of heat resistance 1 | A | A | B | A | A |
| 10% weight loss temperature (° C.) | 365 | 345 | 358 | 335 | 322 |
| Evaluation of heat resistance 2 | A | A | A | B | B |
| Viscosity of pigment dispersion liquid (immediately after dispersion) | 10.5 | 9.3 | 12.2 | 8.4 | 11.7 |
| Viscosity of pigment dispersion liquid (after 1 week at 40° C.) | 11.0 | 10.0 | 12.6 | 8.5 | 12.1 |
| Change in viscosity of dispersion liquid | 5% | 8% | 3% | 1% | 3% |
| Evaluation of pigment dispersion performance | B | B | A | A | A |

TABLE 1-3

|  | Example 21 | Comparative Example 1 | Comparative Example 2 | Comparative Example 3 | Comparative Example 4 |
|---|---|---|---|---|---|
| Weight of polyamine (g) | 10 | 10 | 10 | 10 | 10 |
| Number of moles of amino groups | 0.23 | 0.23 | 0.23 | 0.23 | 0.23 |
| Polyester | PES-4 | PES-1 | PES-2 | PES-3 | PES-4 |
| Weight of polyester (g) | 100 | 100 | 100 | 100 | 100 |

TABLE 1-3-continued

| | | | | | |
|---|---|---|---|---|---|
| Phosphorus-containing compound | hypo-phosphorous acid | — | — | — | — |
| Weight of phosphorus-containing compound (g) | 1.25 | — | — | — | — |
| Phosphorus-containing compound (mol) | 0.0095 | — | — | — | — |
| Phosphorus-containing compound/amino groups of polyamine (mol/mol) | 0.0413 | — | — | — | — |
| Amine value of polyamine before modification | 97 | 97 | 97 | 97 | 97 |
| Amine value of modified polyamine | 47 | 48 | 48 | 45 | 47 |
| Reaction rate (%) | 52% | 51% | 51% | 54% | 52% |
| Color difference (ΔE) before heating | 32.3 | 33.4 | 29.3 | 30.0 | 32.5 |
| Color difference (ΔE) after heating | 37.0 | 66.2 | 64.5 | 63.1 | 63.5 |
| Change in color difference (ΔE) | 4.7 | 32.8 | 35.2 | 33.1 | 31.0 |
| Evaluation of heat resistance 1 | A | D | D | D | D |
| 10% weight loss temperature (° C.) | 341 | 312 | 289 | 270 | 292 |
| Evaluation of heat resistance 2 | B | C | D | D | D |
| Viscosity of pigment dispersion liquid (immediately after dispersion) | 12.9 | 9.9 | 8.3 | 11.7 | 12.9 |
| Viscosity of pigment dispersion liquid (after 1 week at 40° C.) | 13.4 | 10.6 | 8.6 | 12.4 | 13.4 |
| Change in viscosity of dispersion liquid | 4% | 7% | 4% | 6% | 4% |
| Evaluation of pigment dispersion performance | A | B | A | B | A |

| | Comparative Example 5 | Comparative Example 6 | Comparative Example 7 | Comparative Example 8 | Comparative Example 9 |
|---|---|---|---|---|---|
| Weight of polyamine (g) | 10 | 10 | 10 | 10 | 10 |
| Number of moles of amino groups | 0.23 | 0.23 | 0.23 | 0.23 | 0.23 |
| Polyester | PES-2 | PES-2 | PES-2 | PES-2 | PES-2 |
| Weight of polyester (g) | 100 | 100 | 100 | 100 | 100 |
| Phosphorus-containing compound | phosphoric acid | phosphoric acid | phosphite triester | phosphite triester | formic acid |
| Weight of phosphorus-containing compound (g) | 2.5 | 7 | 12 | 36 | 0.4 |
| Phosphorus-containing compound (mol) | 0.0217 | 0.0607 | 0.0186 | 0.0557 | 0.0087 |
| Phosphorus-containing compound/amino groups of polyamine (mol/mol) | 0.0943 | 0.2639 | 0.0809 | 0.2422 | 0.0378 |
| Amine value of polyamine before modification | 97 | 97 | 97 | 97 | 97 |
| Amine value of modified polyamine | 47 | 50 | 48 | 44 | 46 |
| Reaction rate (%) | 52% | 48% | 51% | 55% | 53% |
| Color difference (ΔE) before heating | 30.2 | 33.3 | 29.8 | 30.1 | 30.9 |
| Color difference (ΔE) after heating | 62.2 | 60.5 | 60.3 | 59.8 | 61.2 |
| Change in color difference (ΔE) | 32.0 | 27.2 | 30.5 | 29.7 | 30.3 |
| Evaluation of heat resistance 1 | D | D | D | D | D |
| 10% weight loss temperature (° C.) | 290 | 285 | 287 | 284 | 280 |
| Evaluation of heat resistance 2 | D | D | D | D | D |
| Viscosity of pigment dispersion liquid (immediately after dispersion) | 8.4 | 8.4 | 8.6 | 9.2 | 8.9 |
| Viscosity of pigment dispersion liquid (after 1 week at 40° C.) | 8.7 | 9.1 | 9.3 | 9.6 | 9.6 |
| Change in viscosity of dispersion liquid | 4% | 8% | 8% | 4% | 8% |
| Evaluation of pigment dispersion performance | A | B | B | A | B |

TABLE 1-4

| | Comparative Example 10 | Comparative Example 11 | Comparative Example 12 | Comparative Example 13 |
|---|---|---|---|---|
| Weight of polyamine (g) | 10 | 10 | 10 | 10 |
| Number of moles of amino groups | 0.23 | 0.23 | 0.23 | 0.23 |
| Polyester | PES-2 | PES-2 | PES-1 | PES-1 |
| Weight of polyester (g) | 100 | 100 | 100 | 100 |
| Phosphorus-containing compound | phosphorous acid | phosphorous acid | hypophosphorous acid | hypophosphorous acid |
| Weight of phosphorus-containing compound (g) | 0.015 | 15 | 0.025 | 25 |
| Phosphorus-containing compound (mol) | 0.0002 | 0.1829 | 0.0002 | 0.1894 |
| Phosphorus-containing compound/amino groups of polyamine (mol/mol) | 0.0009 | 0.7952 | 0.0009 | 0.8235 |
| Amine value of polyamine before modification | 97 | 97 | 97 | 97 |
| Amine value of modified polyamine | 45 | 45 | 48 | 45 |
| Reaction rate (%) | 54% | 54% | 51% | 54% |
| Color difference (ΔE) before heating | 28.8 | 29.7 | 32.3 | 32.0 |
| Color difference (ΔE) after heating | 62.8 | 33.6 | 65.2 | 36.7 |
| Change in color difference (ΔE) | 34.0 | 3.9 | 32.9 | 4.7 |
| Evaluation of heat resistance 1 | D | A | D | A |
| 10% weight loss temperature (° C.) | 289 | 342 | 315 | 360 |

TABLE 1-4-continued

|  | Comparative Example 10 | Comparative Example 11 | Comparative Example 12 | Comparative Example 13 |
|---|---|---|---|---|
| Evaluation of heat resistance 2 | D | A | C | A |
| Viscosity of pigment dispersion liquid (immediately after dispersion) | 8.3 | 8.5 | 10.2 | 10.4 |
| Viscosity of pigment dispersion liquid (after 1 week at 40° C.) | 8.5 | 15.3 | 10.8 | 17.3 |
| Change in viscosity of dispersion liquid | 2% | 80% | 6% | 66% |
| Evaluation of pigment dispersion performance | A | D | B | D |

TABLE 2-1

|  | Example 22 | Example 23 | Example 24 | Example 25 | Example 26 |
|---|---|---|---|---|---|
| Weight of polyamine (g) | 10 | 10 | 10 | 10 | 10 |
| Number of moles of amino groups | 0.18 | 0.18 | 0.18 | 0.18 | 0.18 |
| Polyester | PES-1 | PES-1 | PES-1 | PES-1 | PES-1 |
| Weight of polyester (g) | 100 | 100 | 100 | 100 | 100 |
| Phosphorus-containing compound | phosphorous acid | phosphorous acid | phosphorous acid | phosphorous acid | phosphorous acid |
| Weight of phosphorus-containing compound (g) | 0.75 | 0.075 | 0.15 | 1.5 | 4.5 |
| Phosphorus-containing compound (mol) | 0.00915 | 0.00091 | 0.00183 | 0.01829 | 0.05488 |
| Phosphorus-containing compound/amino groups of polyamine (mol/mol) | 0.052 | 0.0052 | 0.010 | 0.104 | 0.313 |
| Amine value of polyamine before modification | 89 | 89 | 89 | 89 | 89 |
| Amine value of modified polyamine | 24 | 23 | 23 | 22 | 25 |
| Reaction rate (%) | 73% | 74% | 74% | 75% | 72% |
| Color difference ($\Delta E$) before heating | 35.8 | 36.1 | 36.5 | 36.2 | 36.0 |
| Color difference ($\Delta E$) after heating | 39.1 | 50.3 | 41.2 | 40.3 | 39.1 |
| Change in color difference ($\Delta E$) | 3.3 | 14.2 | 4.7 | 4.1 | 3.1 |
| Evaluation of heat resistance 1 | A | C | A | A | A |
| Viscosity of pigment dispersion liquid (immediately after dispersion) | 12.1 | 12.4 | 12.7 | 11.8 | 12.2 |
| Viscosity of pigment dispersion liquid (after 1 week at 40° C.) | 12.9 | 13.0 | 13.8 | 13.3 | 14.1 |
| Change in viscosity of dispersion liquid | 7% | 5% | 9% | 13% | 16% |
| Evaluation of pigment dispersion performance | B | B | B | C | C |

|  | Example 27 | Example 28 | Example 29 | Example 30 |
|---|---|---|---|---|
| Weight of polyamine (g) | 10 | 10 | 10 | 10 |
| Number of moles of amino groups | 0.18 | 0.18 | 0.18 | 0.18 |
| Polyester | PES-1 | PES-1 | PES-2 | PES-3 |
| Weight of polyester (g) | 100 | 100 | 100 | 100 |
| Phosphorus-containing compound | phosphorous acid | phosphorous acid | phosphorous acid | phosphorous acid |
| Weight of phosphorus-containing compound (g) | 0.75 | 0.75 | 0.75 | 0.75 |
| Phosphorus-containing compound (mol) | 0.00915 | 0.00915 | 0.00915 | 0.00915 |
| Phosphorus-containing compound/amino groups of polyamine (mol/mol) | 0.052 | 0.052 | 0.052 | 0.052 |
| Amine value of polyamine before modification | 89 | 89 | 89 | 89 |
| Amine value of modified polyamine | 44 | 9 | 23 | 25 |
| Reaction rate (%) | 51% | 90% | 74% | 72% |
| Color difference ($\Delta E$) before heating | 36.8 | 38.2 | 29.6 | 33.8 |
| Color difference ($\Delta E$) after heating | 40.3 | 41.1 | 34.1 | 37.3 |
| Change in color difference ($\Delta E$) | 3.5 | 2.9 | 4.5 | 3.5 |
| Evaluation of heat resistance 1 | A | A | A | A |
| Viscosity of pigment dispersion liquid (immediately after dispersion) | 12.2 | 12.3 | 10.5 | 13.8 |
| Viscosity of pigment dispersion liquid (after 1 week at 40° C.) | 14.3 | 13.8 | 12.1 | 14.8 |
| Change in viscosity of dispersion liquid | 17% | 12% | 15% | 7% |
| Evaluation of pigment dispersion performance | C | B | B | B |

TABLE 2-2

|  | Example 31 | Example 32 | Example 33 | Example 34 | Example 35 |
|---|---|---|---|---|---|
| Weight of polyamine (g) | 10 | 10 | 10 | 10 | 10 |
| Number of moles of amino groups | 0.18 | 0.18 | 0.18 | 0.18 | 0.18 |
| Polyester | PES-4 | PES-1 | PES-1 | PES-1 | PES-1 |
| Weight of polyester (g) | 100 | 100 | 100 | 100 | 100 |
| Phosphorus-containing compound | phosphorous acid | phosphorous acid | hypophosphorous acid | hypophosphorous acid | hypophosphorous acid |

TABLE 2-2-continued

|  |  |  |  |  |  |
|---|---|---|---|---|---|
| Weight of phosphorus-containing compound (g) | 0.75 | 0.75 | 0.075 | 0.125 | 0.75 |
| Phosphorus-containing compound (mol) | 0.00915 | 0.00915 | 0.00114 | 0.00189 | 0.01136 |
| Phosphorus-containing compound/amino groups of polyamine (mol/mol) | 0.052 | 0.052 | 0.006 | 0.011 | 0.065 |
| Amine value of polyamine before modification | 89 | 89 | 89 | 89 | 89 |
| Amine value of modified polyamine | 25 | 23 | 23 | 24 | 23 |
| Reaction rate (%) | 72% | 74% | 74% | 73% | 74% |
| Color difference (ΔE) before heating | 35.8 | 37.2 | 35.5 | 36.1 | 35.7 |
| Color difference (ΔE) after heating | 40.2 | 43.1 | 49.8 | 39.4 | 38.6 |
| Change in color difference (ΔE) | 4.4 | 5.9 | 14.3 | 3.3 | 2.9 |
| Evaluation of heat resistance 1 | A | B | C | A | A |
| Viscosity of pigment dispersion liquid (immediately after dispersion) | 12.2 | 11.7 | 12.3 | 12.1 | 12.5 |
| Viscosity of pigment dispersion liquid (after 1 week at 40° C.) | 13.7 | 12.3 | 12.9 | 12.7 | 12.9 |
| Change in viscosity of dispersion liquid | 12% | 5% | 5% | 5% | 3% |
| Evaluation of pigment dispersion performance | C | B | B | B | A |

|  | Example 36 | Example 37 | Example 38 | Example 39 | Example 40 |
|---|---|---|---|---|---|
| Weight of polyamine (g) | 10 | 10 | 10 | 10 | 10 |
| Number of moles of amino groups | 0.18 | 0.18 | 0.18 | 0.18 | 0.18 |
| Polyester | PES-1 | PES-1 | PES-2 | PES-3 | PES-4 |
| Weight of polyester (g) | 100 | 100 | 100 | 100 | 100 |
| Phosphorus-containing compound | hypophosphorous acid | hypophosphorous acid | hypophosphorous acid | hypophosphorous acid | hypophosphorous acid |
| Weight of phosphorus-containing compound (g) | 1.25 | 3.5 | 0.75 | 0.75 | 0.75 |
| Phosphorus-containing compound (mol) | 0.01894 | 0.05303 | 0.01136 | 0.01136 | 0.01136 |
| Phosphorus-containing compound/amino groups of polyamine (mol/mol) | 0.108 | 0.302 | 0.065 | 0.065 | 0.065 |
| Amine value of polyamine before modification | 89 | 89 | 89 | 89 | 89 |
| Amine value of modified polyamine | 24 | 25 | 22 | 23 | 21 |
| Reaction rate (%) | 73% | 72% | 75% | 74% | 76% |
| Color difference (ΔE) before heating | 35.5 | 36.0 | 30.8 | 34.7 | 35.5 |
| Color difference (ΔE) after heating | 38.1 | 38.5 | 35.1 | 39.3 | 39.9 |
| Change in color difference (ΔE) | 2.6 | 2.5 | 4.3 | 4.6 | 4.4 |
| Evaluation of heat resistance 1 | A | A | A | A | A |
| Viscosity of pigment dispersion liquid (immediately after dispersion) | 13.0 | 14.2 | 10.2 | 13.4 | 13.0 |
| Viscosity of pigment dispersion liquid (after 1 week at 40° C.) | 13.5 | 16.3 | 10.9 | 13.9 | 13.5 |
| Change in viscosity of dispersion liquid | 4% | 15% | 7% | 4% | 4% |
| Evaluation of pigment dispersion performance | B | C | B | A | A |

TABLE 2-3

|  | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 |
|---|---|---|---|---|---|---|---|---|---|
| Weight of polyamine (g) | 10 | 10 | 10 | 10 | 10 | 10 | 10 | 10 | 10 |
| Number of moles of amino groups | 0.18 | 0.18 | 0.18 | 0.18 | 0.18 | 0.18 | 0.18 | 0.18 | 0.18 |
| Polyester | PES-1 | PES-2 | PES-3 | PES-4 | PES-1 | PES-1 | PES-1 | PES-1 | PES-1 |
| Weight of polyester (g) | 100 | 100 | 100 | 100 | 100 | 100 | 100 | 100 | 100 |
| Phosphorus-containing compound | — | — | — | — | phosphoric acid | phosphoric acid | phosphite triester | phosphite triester | formic acid |
| Weight of phosphorus-containing compound (g) | — | — | — | — | 1.275 | 5.95 | 12 | 36 | 0.4 |
| Phosphorus-containing compound (mol) | — | — | — | — | 0.01301 | 0.06071 | 0.01858 | 0.05573 | 0.00870 |
| Phosphorus-containing compound/amino groups of polyamine (mol/mol) | — | — | — | — | 0.074 | 0.346 | 0.106 | 0.318 | 0.050 |

TABLE 2-3-continued

|  | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 |
|---|---|---|---|---|---|---|---|---|---|
| Amine value of polyamine before modification | 89 | 89 | 89 | 89 | 89 | 89 | 89 | 89 | 89 |
| Amine value of modified polyamine | 23 | 22 | 24 | 24 | 25 | 24 | 24 | 21 | 21 |
| Reaction rate (%) | 74% | 75% | 73% | 73% | 72% | 73% | 73% | 76% | 76% |
| Color difference (ΔE) before heating | 42.3 | 42.0 | 42.7 | 43.0 | 43.0 | 41.2 | 41.0 | 40.3 | 41.1 |
| Color difference (ΔE) after heating | 72.8 | 73.1 | 70.8 | 69.9 | 72.2 | 70.8 | 68.3 | 66.9 | 70.8 |
| Change in color difference (ΔE) | 30.5 | 31.1 | 28.1 | 26.9 | 29.2 | 29.6 | 27.3 | 26.6 | 29.7 |
| Evaluation of heat resistance 1 | D | D | D | D | D | D | D | D | D |
| Viscosity of pigment dispersion liquid (immediately after dispersion) | 11.6 | 10.0 | 12.5 | 13.3 | 12.6 | 12.9 | 13.2 | 13.5 | 13.0 |
| Viscosity of pigment dispersion liquid (after 1 week at 40° C.) | 12.0 | 11.1 | 13.4 | 14.2 | 13.5 | 14.0 | 14.0 | 14.2 | 14.1 |
| Change in viscosity of dispersion liquid | 3% | 11% | 7% | 7% | 7% | 9% | 6% | 5% | 8% |
| Evaluation of pigment dispersion performance | A | B | B | B | B | B | B | B | B |

TABLE 2-4

|  | Comparative Example 23 | Comparative Example 24 | Comparative Example 25 | Comparative Example 26 |
|---|---|---|---|---|
| Weight of polyamine (g) | 10 | 10 | 10 | 10 |
| Number of moles of amino groups | 0.18 | 0.18 | 0.18 | 0.18 |
| Polyester | PES-1 | PES-1 | PES-1 | PES-1 |
| Weight of polyester (g) | 100 | 100 | 100 | 100 |
| Phosphorus-containing compound | phosphorous acid | phosphorous acid | hypophosphorous acid | hypophosphorous acid |
| Weight of phosphorus-containing compound (g) | 0.015 | 15 | 0.0125 | 12.5 |
| Phosphorus-containing compound (mol) | 0.00018 | 0.18293 | 0.00019 | 0.18939 |
| Phosphorus-containing compound/amino groups of polyamine (mol/mol) | 0.001 | 1.043 | 0.001 | 1.080 |
| Amine value of polyamine before modification | 89 | 89 | 89 | 89 |
| Amine value of modified polyamine | 24 | 23 | 24 | 24 |
| Reaction rate (%) | 73% | 74% | 73% | 73% |
| Color difference (ΔE) before heating | 39.9 | 36.7 | 38.7 | 36.3 |
| Color difference (ΔE) after heating | 70.1 | 38.9 | 69.9 | 39.0 |
| Change in color difference (ΔE) | 30.2 | 2.2 | 31.2 | 2.7 |
| Evaluation of heat resistance 1 | D | A | D | A |
| Viscosity of pigment dispersion liquid (immediately after dispersion) | 12.6 | 19.8 | 12.8 | 19.3 |
| Viscosity of pigment dispersion liquid (after 1 week at 40° C.) | 14.2 | 34.5 | 13.1 | 30.8 |
| Change in viscosity of dispersion liquid | 13% | 74% | 2% | 60% |
| Evaluation of pigment dispersion performance | C | D | A | D |

In the tables, the compounds used are as follows.

Phosphorous acid: phosphorous acid (manufactured by Wako Pure Chemical Industries, Ltd.)

Hypophosphorous acid: a 50% aqueous solution of hypophosphorous acid (manufactured by Wako Pure Chemical Industries, Ltd.)

Phosphoric acid; a 85% aqueous solution of phosphoric acid (manufactured by Wako Pure Chemical Industries, Ltd.)

Phosphite triester: tris(2,4-di-t-butylphenyl) phosphite (manufactured by Great Lakes Corporation)

The modified polyamine produced by a reaction of a given polyamine, polyester, and phosphorus-containing compound is less colored by heating and has a high 10% weight loss temperature, and therefore has favorable heat resistance. On the other hand, in the case of using phosphoric acid and a phosphite triester (tris(2,4-di-t-butylphenyl)phosphite) which is an antioxidant described in Patent document 4 (JP-A-2010-134278) (Comparative Examples 5 to 8 and Comparative Examples 18 to 21), and in the case of a modified polyamine obtained without using a phosphorus-containing compound (Comparative Examples 1 to 4 and Comparative Examples 14 to 17), the modified polyamine is greatly colored by heating and has a low 10% weight loss temperature, and therefore the heat resistance tends to be poor as compared with the case of Examples 1 and others. Further, in the case where the ratio of the number of moles of the phosphorus-containing compound to the number of moles of amino groups in the polyamine is 0.001 or less, the heat resistance tends to be poor as compared with the case of Examples 1 and others. Further, in the case where the ratio of the number of moles of the same is 0.7 or more, the heat resistance is favorable, however, a rate of change in viscosity of a pigment dispersion liquid obtained using this modified polyamine is large and the performance thereof as a pigment dispersant tends to be poor as compared with the case of Examples 1 and others.

FORMULATION EXAMPLES

Formulation Example 1

Ink Composition

| Component | Parts by weight |
|---|---|
| Modified polyamine of Example 1 | 2 |
| Copper phthalocyanine pigment "Fastogen Blue GNPSG" (manufactured by DIC Corporation) | 20 |
| Ethyl acetate | 52 |
| Isopropyl alcohol | 16 |
| Urea bond-containing urethane resin (weight average molecular weight: 30000) | 12 |

Formulation Example 2

Inkjet Ink

| Component | Parts by weight |
|---|---|
| Modified polyamine of Example 22 | 1 |
| Copper phthalocyanine pigment "Fastogen Blue GNPSG" (manufactured by DIC Corporation) | 4 |
| 2-Phenoxyethyl acrylate | 15 |
| Isobornyl acrylate | 30 |
| Ethoxylated trimethylolpropane triacrylate | 15 |
| Irgacure 907 (manufactured by Ciba Specialty Chemicals, Inc.) | 10 |

Formulation Example 3

Color Filter Resist Composition

| Component | Parts by weight |
|---|---|
| Modified polyamine of Example 1 | 1 |
| Copper phthalocyanine pigment "Fastogen Blue GNPSG" (manufactured by DIC Corporation) | 3 |
| Propylene glycol monomethyl ether acetate | 50 |
| Styrene/acrylate copolymer (weight ratio: 80:20) weight average molecular weight: 20000 | 10 |
| Dipentaerythritol hexaacrylate | 4 |
| Irgacure 907 (manufactured by Ciba Specialty Chemicals, Inc.) | 0.5 |

INDUSTRIAL APPLICABILITY

By using a specific modified polyamine obtained by binding a polyamine, a polyester, and a phosphorus-containing compound of the invention as an effective component, it has become possible to provide a pigment dispersant which exhibits excellent pigment dispersion performance, shows little change in color tone even if it is used in a high-temperature environment, shows little change in weight by thermal decomposition, and has excellent heat resistance. The pigment dispersant can be widely used in a field which needs a coating step requiring heating in the production of a color filter, and so on.

The invention claimed is:

1. A modified polyamine produced by a reaction of:
   (i) a polyamine containing 2 to 1800 primary and/or secondary amino groups per molecule;
   (ii) a polyester; and
   (iii) a phosphorus-containing compound selected from the group consisting of a compound represented by the formula (1), a tautomer thereof, a metal salt thereof, and an amine salt thereof:

(1)

wherein $R_1$ and $R_2$ each independently represent hydrogen, a hydroxy group, a cyano group, or —O—$R_3$, and $R_3$ represents a hydrocarbon group having 1 to 24 carbon atoms, wherein
the polyamine and the phosphorous-containing compound form a salt through a free amino group of the polyamine and a hydroxyl group of the phosphorous-containing compound, and
an amount of the phosphorus-containing compound is from 0.004 to 0.7 mol/a number of moles of amino groups with respect to the number of moles of the primary and/or secondary amino groups of the polyamine.

2. The modified polyamine according to claim 1, wherein the polyamine is selected from the group consisting of a poly(lower alkylene)imine, with the proviso that the lower alkylene has 2 to 4 carbon atoms, and a polyallylamine.

3. The modified polyamine according to claim 1, wherein the polyamine is selected from the group consisting of a polyethyleneimine containing a repeating unit represented by the formula (2) and a polyallylamine containing a repeating unit represented by the formula (3):

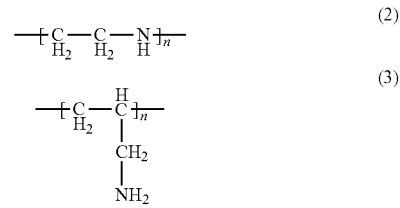

wherein n represents the number of repeating units.

4. The modified polyamine according to claim 3, wherein the polyallylamine has a number average molecular weight of from 150 to 100,000.

5. The modified polyamine according to claim 1, wherein the polyester is represented by the formula (4):

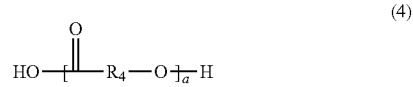

(4)

wherein R4 represents a linear or branched alkylene group having 2 to 20 carbon atoms, and a represents an integer of 2 to 100.

6. The modified polyamine according to claim 1, wherein the polyester is represented by the formula (5):

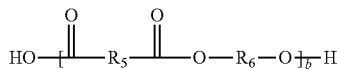
(5)

wherein R5 represents a linear or branched alkylene group having 2 to 20 carbon atoms, $C_6H_4$, or CH=CH, $R_6$ represents a linear or branched alkylene group having 2 to 20 carbon atoms or a group obtained by removing two hydroxy groups from a polyalkylene glycol, and b represents an integer of 2 to 100, with the proviso that in a chain of the linear or branched alkylene group, an ether bond may be contained.

7. The modified polyamine according to claim 1, wherein the amount of the polyester is from 2 to 50 parts by weight with respect to 1 part by weight of the polyamine.

8. A pigment dispersant, comprising the modified polyamine according to claim 1.

9. A pigment-containing composition, comprising the modified polyamine according to claim 1, an organic solvent, and a pigment.

10. The pigment-containing composition according to claim 9, further comprising a resin selected from the group consisting of an alkyd resin, a polyester resin, an acrylic resin, an epoxy resin, a polyurethane resin, a silicone resin, a fluorine resin, a melamine resin, a benzoguanamine resin, a urea resin, a polyamide resin, a phenolic resin, a polyvinyl chloride resin, a polyethylene resin, and a polyolefin resin.

11. The pigment-containing composition according to claim 9, wherein the organic solvent comprises at least one member selected from the group consisting of hydrocarbon solvents, halogenated hydrocarbon solvents, ether solvents, ketone solvents, ester solvents, alcohol solvents, monoether solvents of alkylene glycols and amide solvents.

12. The pigment-containing composition according to claim 9, wherein the pigment comprises at least one member selected from the group consisting of inorganic pigments and organic pigments.

13. A method of making the pigment-containing composition according to claim 9, comprising combining the modified polyamine according to claim 1, organic solvent, and pigment.

14. A method of preparing a pigmented paint, a printing ink, a color filter ink, a color filter resist, an inkjet ink, a copy ink, a magnetic tape, a rubber magnet, a color plastic molded product, and a sealing agent to be used for construction, comprising incorporating the pigment-containing composition according to claim 9 into the pigmented paint, printing ink, color filter ink, color filter resist, inkjet ink, copy ink, magnetic tape, rubber magnet, color plastic molded product, or sealing agent to be used for construction.

15. A pigmented paint, printing ink, color filter ink, color filter resist, inkjet ink, copy ink, magnetic tape, rubber magnet, color plastic molded product, or sealing agent to be used for construction, containing the pigment-containing composition according to claim 9.

16. A color filter containing the pigment-containing composition according to claim 9.

17. The modified polyamine according to claim 1, wherein the polyester has an acid value of from 2.8 to 190.

18. A method of preparing the modified polyamine according to claim 1, comprising reacting the polyamine, polyester and phosphorus-containing compound.

* * * * *